(12) United States Patent
Uoe et al.

(10) Patent No.: US 8,782,893 B2
(45) Date of Patent: Jul. 22, 2014

(54) METHOD FOR MANUFACTURING A HONEYCOMB-STRUCTURED OBJECT

(75) Inventors: Kousuke Uoe, Niihama (JP); Teruo Komori, Niihama (JP); Masaharu Mori, Mitoyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 79 days.

(21) Appl. No.: 13/637,852

(22) PCT Filed: Mar. 29, 2011

(86) PCT No.: PCT/JP2011/057873
§ 371 (c)(1),
(2), (4) Date: Oct. 31, 2012

(87) PCT Pub. No.: WO2011/122635
PCT Pub. Date: Oct. 6, 2011

(65) Prior Publication Data
US 2013/0036612 A1    Feb. 14, 2013

(30) Foreign Application Priority Data

Mar. 30, 2010  (JP) ................................. 2010-078153

(51) Int. Cl.
*F01N 3/24*    (2006.01)
(52) U.S. Cl.
USPC .......................... 29/890.08; 425/127; 425/389
(58) Field of Classification Search
CPC ........... F01N 3/24; F01N 3/033; F01N 3/035; F01N 3/10; F01N 3/28
USPC ........ 29/890, 890.08; 422/177, 176; 425/110, 425/117, 127, 389
See application file for complete search history.

(56) References Cited

U.S. PATENT DOCUMENTS 4,293,357 A    10/1981  Higuchi et al.
4,427,728 A *   1/1984  Belmonte et al. ............. 428/117
(Continued)

FOREIGN PATENT DOCUMENTS

JP          63-24731 B2    1/1982
JP          63-024731 A    2/1988
(Continued)

OTHER PUBLICATIONS

Extended European Search Report issued Aug. 7, 2013 in European Patent Application No. 11762859.4.
(Continued)

*Primary Examiner* — David Bryant
*Assistant Examiner* — Jason L Vaughan
(74) *Attorney, Agent, or Firm* — Sughrue Mion, PLLC

(57) ABSTRACT

A method for manufacturing a honeycomb-structured object having a plurality of through holes having ends thereof plugged, including a step of pressing a plugging material against one end surface of a honeycomb-structured object 70 having a plurality of through holes 70a by a plate 20 to fill one ends of the through holes 70a with the plugging material; and a step of protruding a part of a portion in the plate 20 opposed to the one end surface of the honeycomb-structured object 70 toward the one end surface to pull the other part of the portion in the plate 20 opposed to the one end surface of the honeycomb-structured object 70 and the one end surface away from each other.

8 Claims, 9 Drawing Sheets

(56) References Cited

U.S. PATENT DOCUMENTS

| | | | |
|---|---|---|---|
| 4,506,066 A | | 3/1985 | Medem et al. |
| 4,557,682 A | * | 12/1985 | Montierth ............... 425/121 |
| 4,557,773 A | * | 12/1985 | Bonzo ..................... 156/64 |
| 4,573,896 A | * | 3/1986 | Bonzo ..................... 425/125 |
| 4,715,576 A | * | 12/1987 | Montierth ............... 249/60 |
| 4,715,801 A | * | 12/1987 | Montierth ............... 425/110 |
| 5,021,204 A | * | 6/1991 | Frost et al. ............. 264/630 |
| 7,156,934 B2 | * | 1/2007 | Fukuta et al. ........... 156/89.22 |
| 7,722,791 B2 | * | 5/2010 | Kimura et al. .......... 264/275 |
| 7,727,451 B2 | * | 6/2010 | Naruse et al. ........... 264/296 |
| 7,803,303 B2 | * | 9/2010 | Hagg ...................... 264/267 |
| 7,919,033 B2 | * | 4/2011 | Shoji et al. ............. 264/269 |
| 7,922,951 B2 | * | 4/2011 | Mudd et al. ............. 264/259 |
| 8,192,667 B2 | * | 6/2012 | Shoji et al. ............. 264/269 |
| 8,460,589 B2 | * | 6/2013 | Tokumaru ............... 264/177.12 |
| 8,609,002 B2 | * | 12/2013 | Cecce et al. ............. 264/267 |
| 2005/0221014 A1 | | 10/2005 | Nate et al. |
| 2006/0131782 A1 | | 6/2006 | Mudd et al. |
| 2008/0128082 A1 | | 6/2008 | Masuda et al. |
| 2013/0022697 A1 | | 1/2013 | Uoe et al. |

FOREIGN PATENT DOCUMENTS

| | | |
|---|---|---|
| JP | 63-14731 B2 | 4/1988 |
| JP | 2004-025098 A | 1/2004 |
| JP | 2008-524039 A | 7/2008 |
| JP | 2009-190364 A | 8/2009 |
| JP | 2011-073161 A | 4/2011 |
| JP | 2011-212851 A | 10/2011 |
| WO | 2004-002607 A1 * | 1/2004 ............ B01D 39/20 |
| WO | 2011/122636 A1 | 10/2011 |

OTHER PUBLICATIONS

International Preliminary Report on Patentability in International Application No. PCT/JP2011/057873 issued Nov. 22, 2012.

Office Action issued Mar. 21, 2014 in counterpart European Patent Application No. 11762859.4.

* cited by examiner

Fig.5
(a)
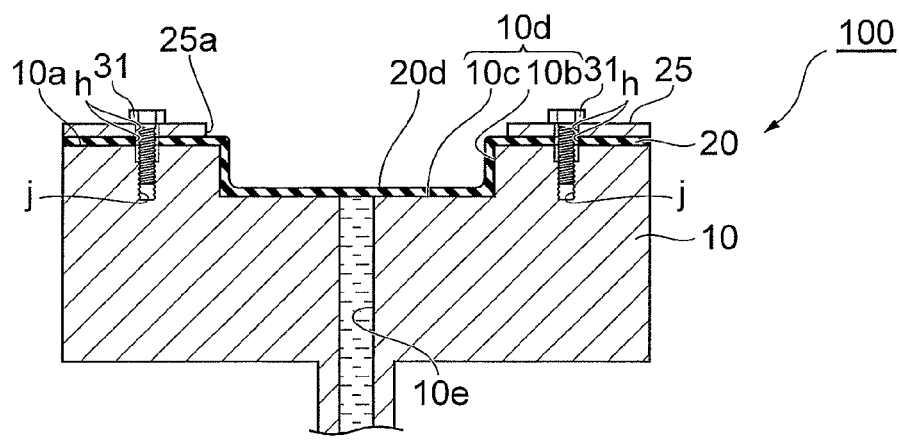
(b)
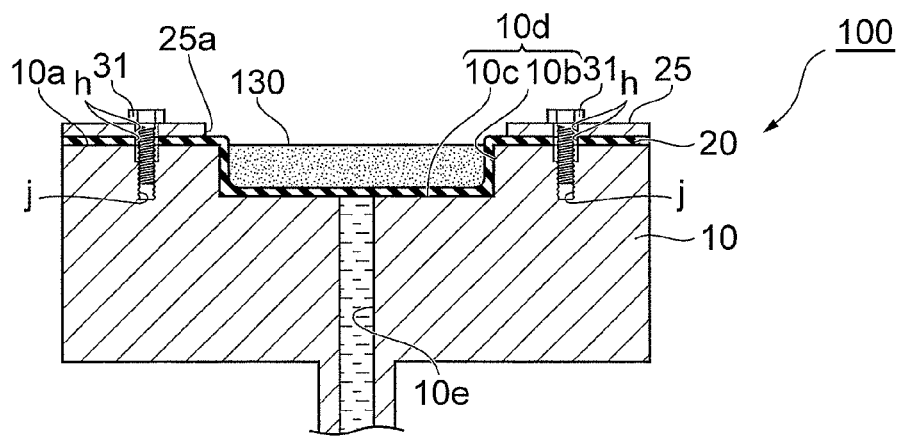

Fig.6
(a)
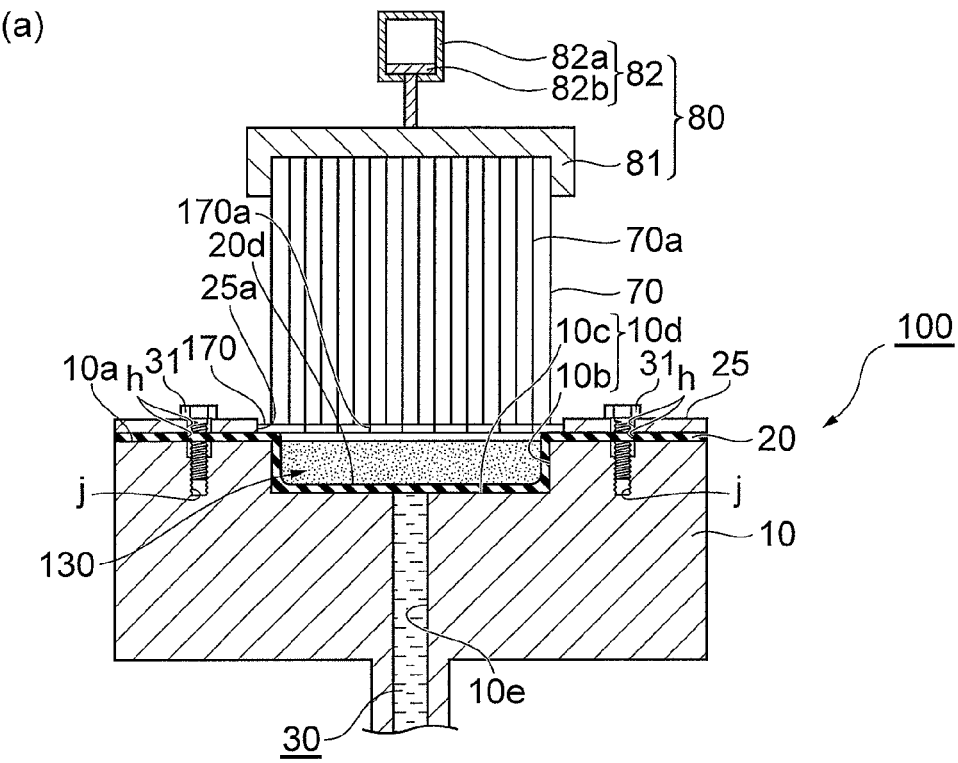
(b)
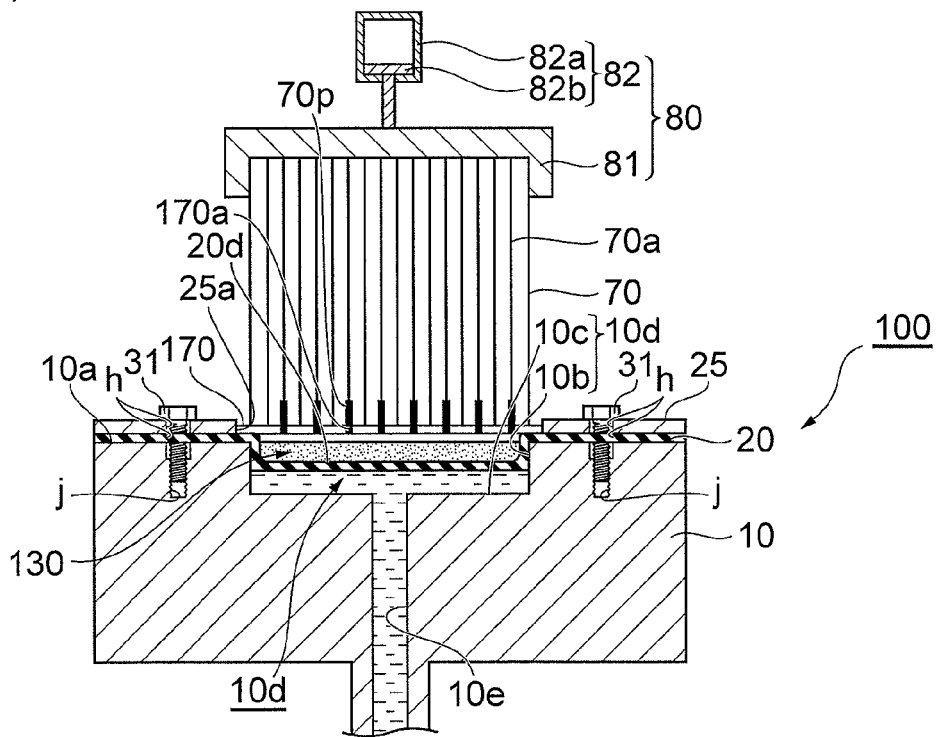

*Fig.7*
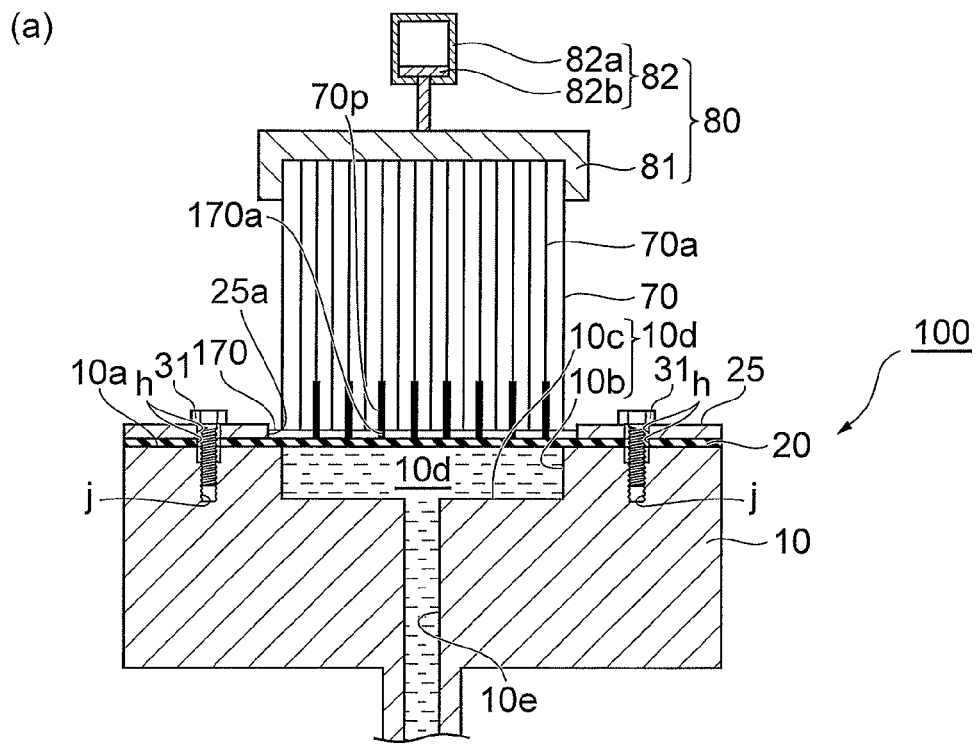
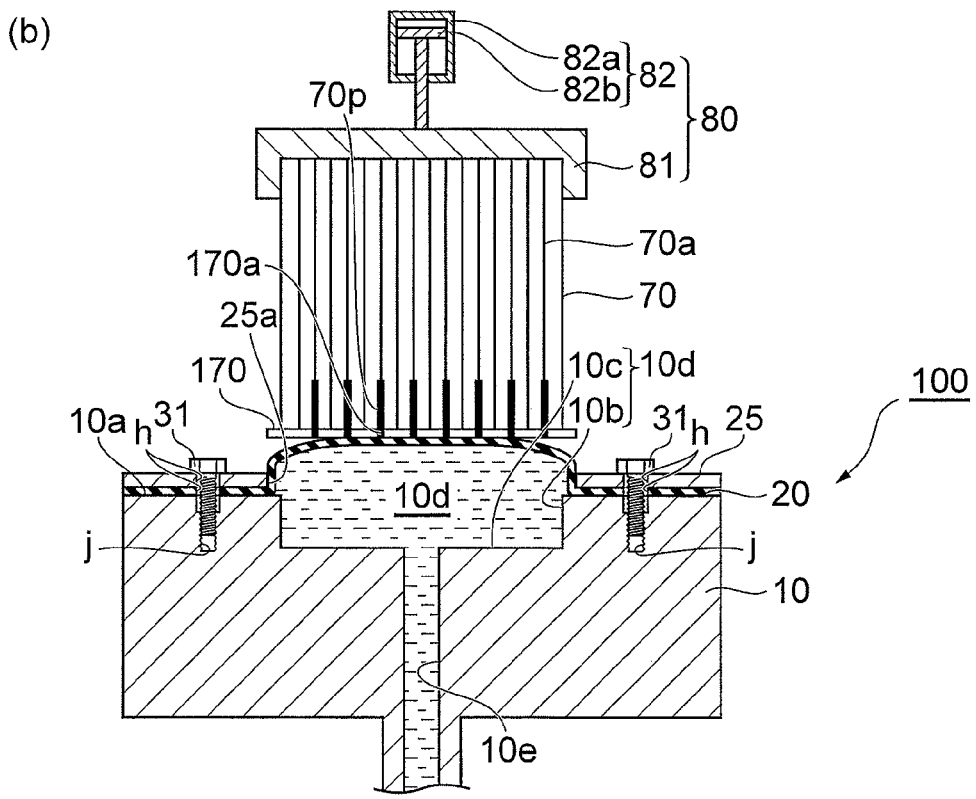

Fig.8
(a)
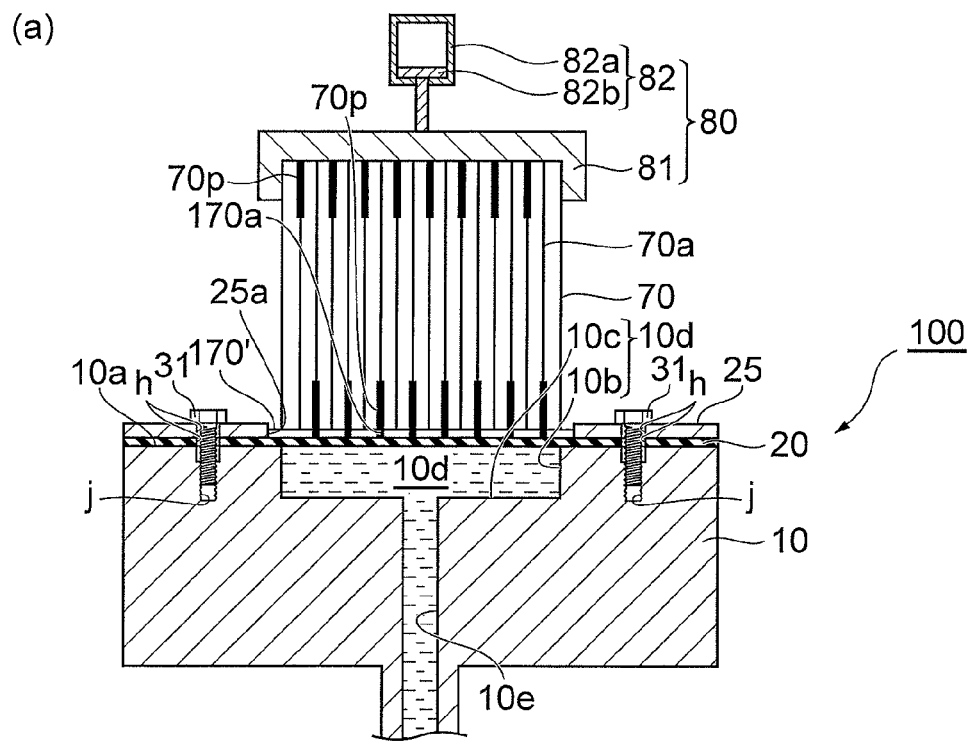
(b)
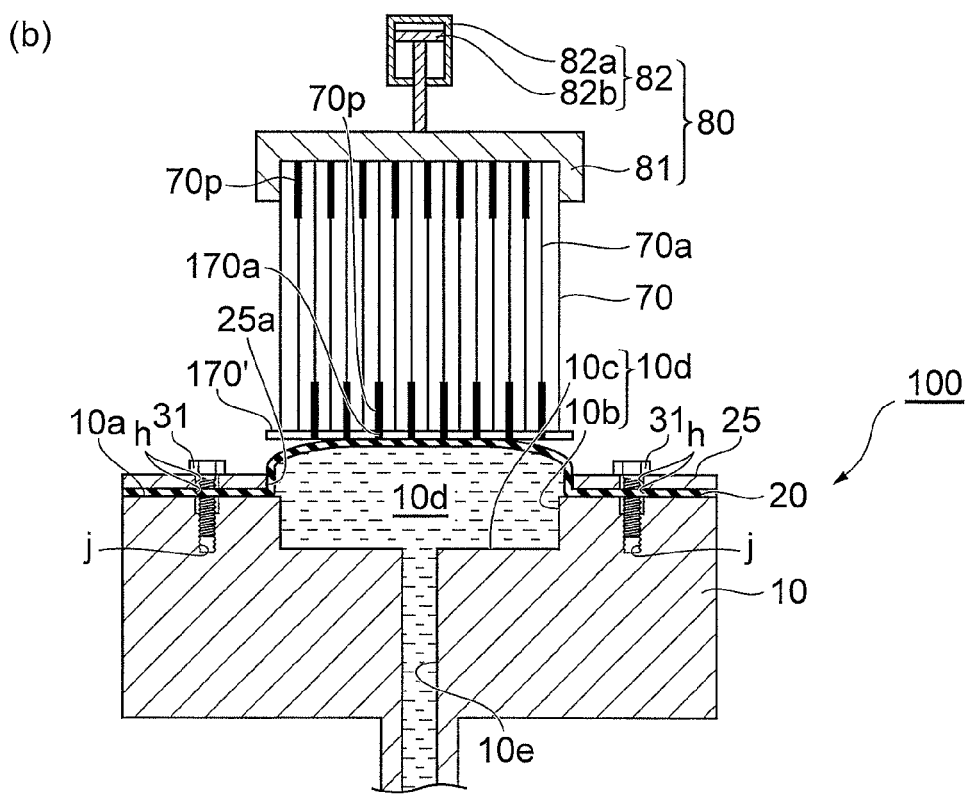

Fig.9
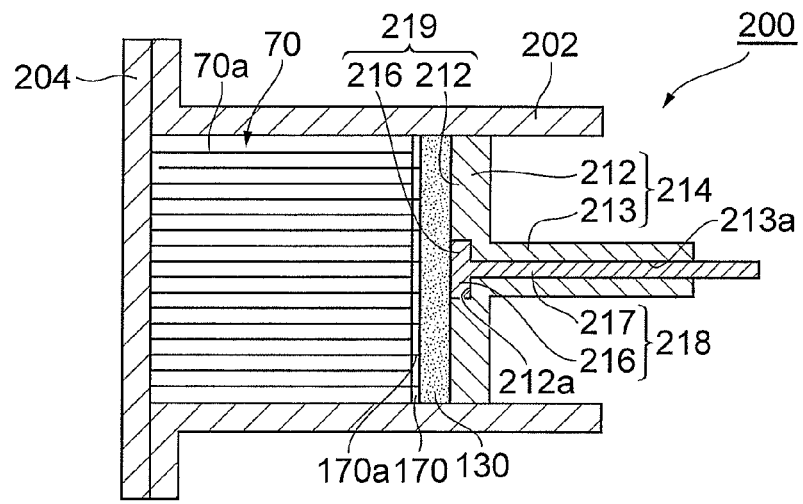
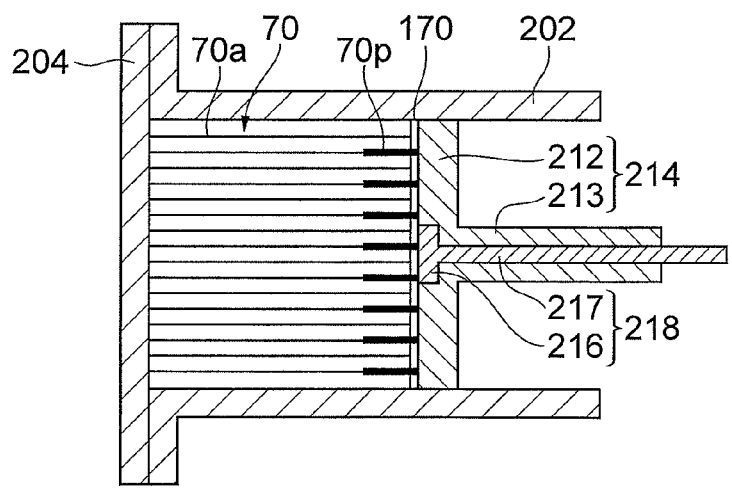
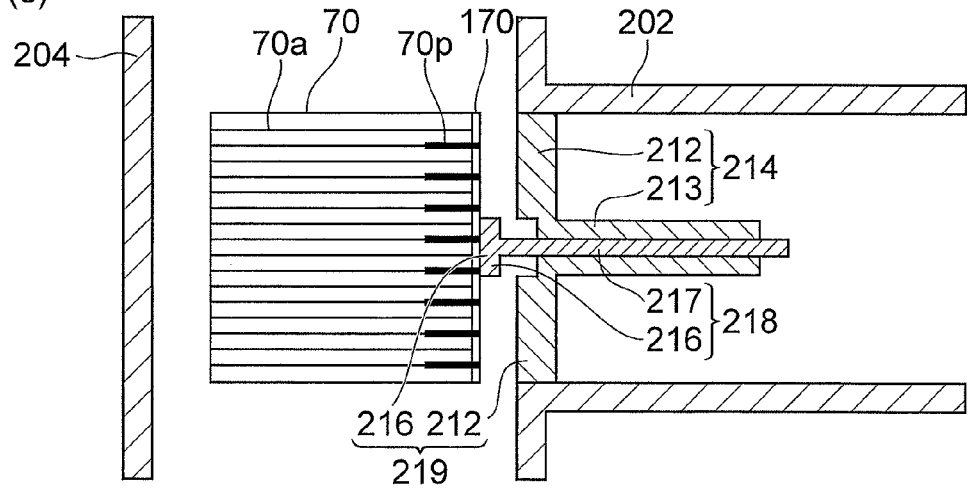

METHOD FOR MANUFACTURING A HONEYCOMB-STRUCTURED OBJECT

CROSS REFERENCE TO RELATED APPLICATIONS

This application is a National Stage of International Application No. PCT/JP2011/057873 filed Mar. 29, 2011, claiming priority based on Japanese Patent Application No. 2010-078153, filed Mar. 30, 2010, the contents of all of which are incorporated herein by reference in their entirety.

TECHNICAL FIELD

The present invention relates to a method for manufacturing a honeycomb-structured object having a plurality of through holes having ends thereof plugged.

BACKGROUND ART

Conventionally, honeycomb filter-structured objects have been widely known for use in DPFs (Diesel particulate filters) and the like. This honeycomb filter-structured object has a structure in which one end side of a part of the through holes of a honeycomb-structured object having a large number of through holes is plugged with a plugging material, and the other end side of the remaining through holes is plugged with the plugging material. In Patent Literature 1, a method for manufacturing such a honeycomb filter-structured object is disclosed. In Patent Literature 1, by pressing a plugging material against one end of a honeycomb-structured object 1 arranged in a cylinder 7 by a piston 8, the plugging material is supplied to ends of the through holes of the honeycomb-structured object.

CITATION LIST

Patent Literature

Patent Literature 1: Japanese Examined Patent Publication No. 63-24731

SUMMARY OF INVENTION

Technical Problem

However, in the conventional method, it is difficult to pull the piston away from the honeycomb-structured object after plugging one end side of the honeycomb-structured object with the plugging material and to equally supply the plugging material to the plurality of through holes, and production efficiency has decreased.

The present invention has been made in view of the above problems, and it is an object of the present invention to provide a method for manufacturing a honeycomb-structured object that is excellent in production efficiency.

Solution to Problem

A first method for manufacturing a honeycomb-structured object having a plurality of through holes having ends thereof plugged according to the present invention includes:

a step A of pressing a plugging material against one end surface of a honeycomb-structured object having a plurality of through holes by a plate to fill one ends of the through holes with the plugging material; and a step B of protruding a part of a portion in the plate opposed to the one end surface toward the one end surface to pull the other part of the portion in the plate opposed to the one end surface and the one end surface away from each other.

According to the present invention, after a state in which the plate and one end surface of the honeycomb-structured object are close to each other is provided by the filling of the plugging agent, a part of the plate protrudes toward the one end surface, and the one end surface goes away from the other part of the plate, and therefore, it is easy to pull the honeycomb-structured object away from the plate.

Here, it is preferable that the part of the portion in the plate opposed to the one end surface is a central portion of the portion in the plate opposed to the one end surface.

Thus, it is easy to pull the honeycomb-structured object away from the plate.

In addition, it is preferable that in the step A, a mask is interposed between the one end surface and the plate, and the mask has through holes communicating with only a part of the plurality of through holes of the honeycomb-structured object.

According to this, it is easy to plug one ends of a part of the through holes. According to the step B, it is easy to pull the honeycomb-structured object and the mask away from the plate in the state of pressing the plugging material against one end surface of the honeycomb-structured object.

In addition, it is preferable that the plate is an elastic body, and the protrusion is performed by deforming the portion in the plate opposed to the one end surface in the form of a raised portion toward the one end surface. Thus, the step B can be easily performed.

Further, it is preferable to further include a step C of pressing the plugging material against the other end surface of the honeycomb-structured object by the plate after the step B to fill the other ends of other through holes of the honeycomb-structured object with the plugging material; and a step D of protruding a part of the portion in the plate opposed to the other end surface toward the other end surface after the step C to pull the other part of the portion in the plate opposed to the one end surface and the other end surface away from each other.

Thus, it is easy to pull the plate away from an end surface of the honeycomb-structured object.

In addition, it is preferable that the step A is perform by preparing a main body portion having a depressed portion and a communication path opening into an inner surface of the depressed portion, and an elastic plate arranged so as to cover the depressed portion, discharging a fluid in the depressed portion via the communication path to form a depressed portion of the elastic plate, supplying a plugging material into the depressed portion of the elastic plate, arranging one end surface of a honeycomb-structured object having a plurality of through holes at a position opposed to the depressed portion of the elastic plate, and supplying the fluid between the main body portion and the elastic plate via the communication path to eliminate the depressed portion of the elastic plate, and the step B is performed by further supplying the fluid between the main body portion and the elastic plate via the communication path to deform a portion in the elastic plate opposed to the one end surface of the honeycomb-structured object in the form of a raised portion toward the one end surface.

A second method for manufacturing a honeycomb-structured object having a plurality of through holes having ends thereof plugged according to the present invention includes:

a step A of pressing a plugging material against one end surface of a honeycomb-structured object having a plurality of through holes by an elastic plate to fill one ends of the through holes with the plugging material; and a step B of deforming a portion in the elastic plate opposed to the one end surface in the form of a raised portion toward the one end surface to pull a peripheral portion of the portion in the elastic plate opposed to the one end surface and the one end surface away from each other.

According to the present invention, after a state in which the plate and one end surface of the honeycomb-structured object are close to each other is provided by the filling of the plugging agent, the elastic plate deforms in the form of a raised portion toward the one end surface, and the one end surface goes away from the peripheral portion of the elastic plate, and therefore, it is easy to pull the honeycomb-structured object away from the elastic plate.

A third method for manufacturing a honeycomb-structured object having a plurality of through holes having ends thereof plugged according to the present invention includes:

a step of preparing a main body portion having a depressed portion and a communication path opening into an inner surface of the depressed portion, and an elastic plate arranged so as to cover the depressed portion;

a step of discharging a fluid in the depressed portion via the communication path to form a depressed portion of the elastic plate;

a step of supplying a plugging material into the depressed portion of the elastic plate;

a step of arranging one end surface of a honeycomb-structured object having a plurality of through holes at a position opposed to the depressed portion of the elastic plate; and a step of supplying the fluid between the main body portion and the elastic plate via the communication path to eliminate the depressed portion of the elastic plate.

According to the present invention, the plugging material is supplied by eliminating the depressed portion of the elastic plate, and therefore, the plurality of through holes can be relatively equally filled with the plugging material.

Advantageous Effects of Invention

According to the present invention, a method for manufacturing a honeycomb-structured object that is excellent in production efficiency is provided.

BRIEF DESCRIPTION OF DRAWINGS

FIG. 5(a) is a partial cross-sectional view for explaining the operation of the plugging device in FIG. 1, and FIG. 5(b) is a partial cross-sectional view following FIG. 5(a).

FIG. 6(a) is a partial cross-sectional view following FIG. 5(b), and FIG. 6(b) is a partial cross-sectional view following FIG. 6(a).

FIG. 7(a) is a partial cross-sectional view following FIG. 6(b), and FIG. 7(b) is a partial cross-sectional view following FIG. 7(a).

FIG. 8(a) is a partial cross-sectional view following FIG. 7(b), and FIG. 8(b) is a partial cross-sectional view following FIG. 7(a).

FIG. 9(a) is a cross-sectional view for explaining the operation of a plugging device according to the second embodiment of the present invention, FIG. 9(b) is a partial cross-sectional view following FIG. 9(a), and FIG. 9(c) is a partial cross-sectional view following FIG. 9(b).

DESCRIPTION OF EMBODIMENTS

Preferred embodiments of a plugging device according to the present invention will be described with reference to the drawings. In description, like numerals are used for like elements or elements having like functions, and redundant description is omitted.

First Embodiment

Figure 1:
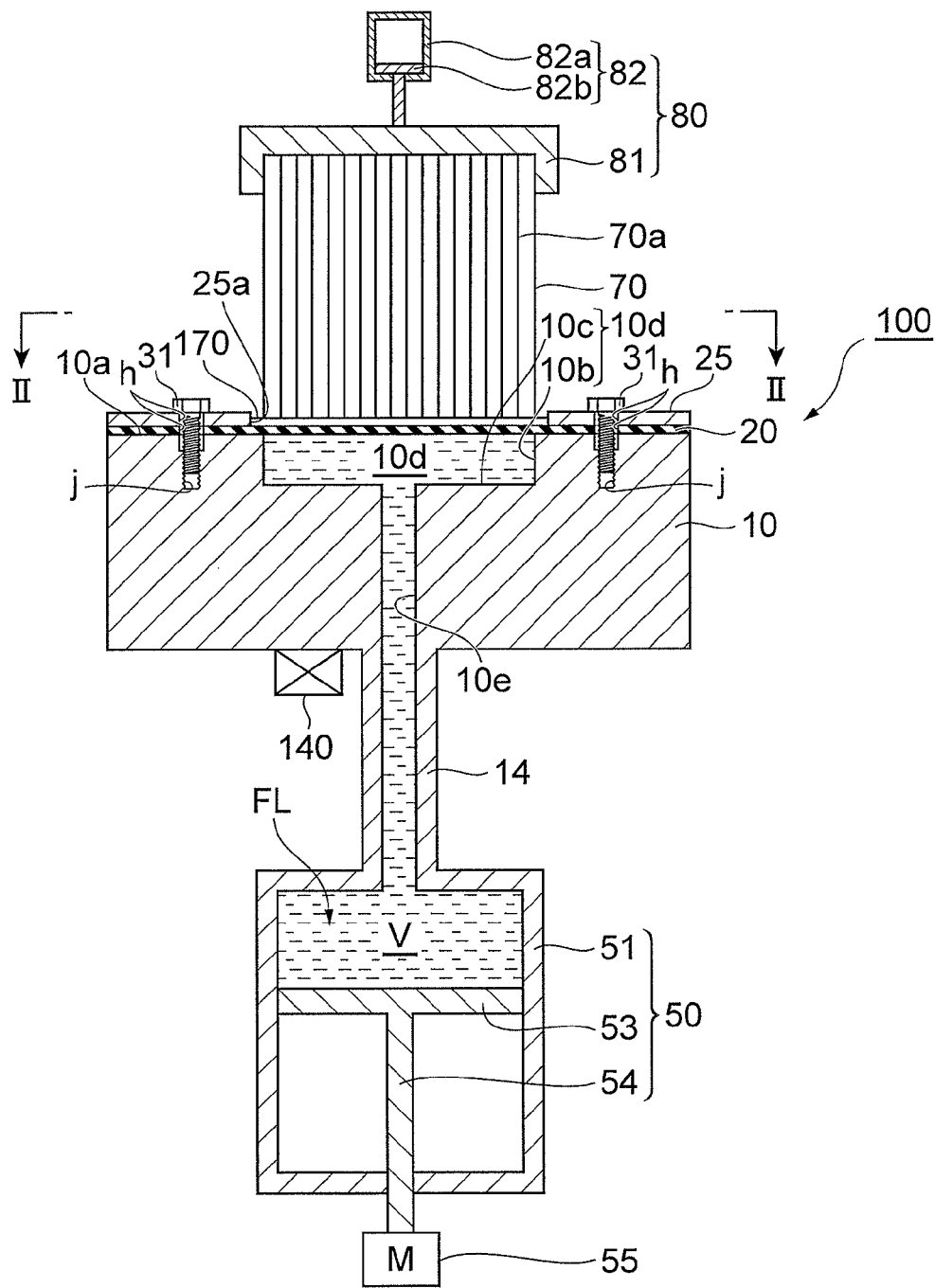
FIG. 1 is a schematic cross-sectional view of a plugging device according to the first embodiment of the present invention.

FIG. 1 is a schematic cross-sectional view of a plugging device 100 according to a first embodiment in this embodiment. The plugging device 100 according to this embodiment mainly includes a main body portion 10, an elastic plate 20, a pump 50, and a holding portion 80.

Figure 2:
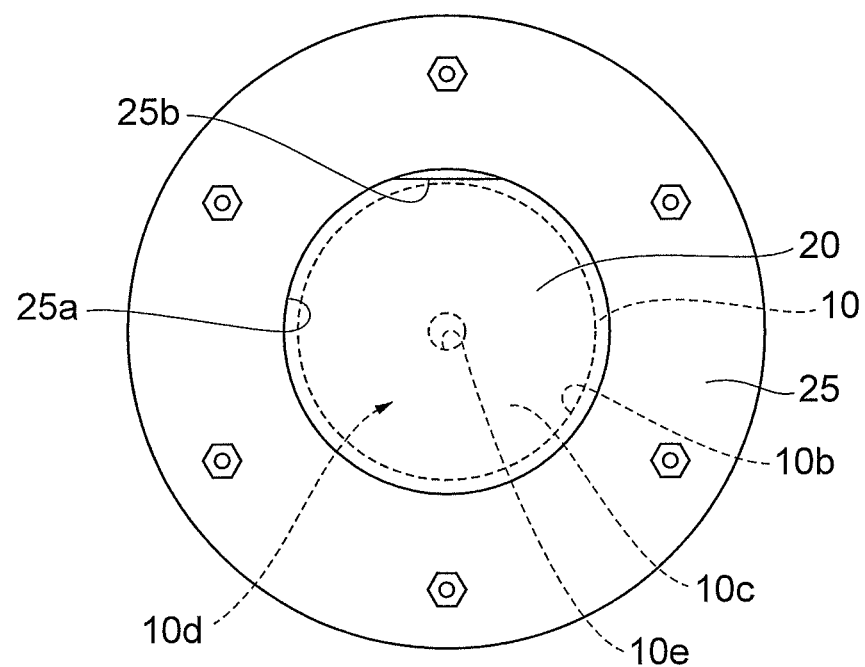
FIG. 2 is an arrow view II-II of the plugging device in FIG. 1.

The main body portion 10 is formed of a rigid material. Examples of the rigid material include metals, such as stainless steel, and polymer materials, such as fiber-reinforced plastics. A depressed portion 10d is formed on the upper surface 10a of the main body portion 10. In this embodiment, the shape of the depressed portion 10d is made a cylindrical shape, as shown in FIG. 1 and FIG. 2. The side surface 10b and bottom surface 10c of the depressed portion 10d are made perpendicular and parallel to the upper surface 10a of the main body portion 10, respectively. The diameter of the depressed portion 10d can be, for example, 100 to 320 mm. The depth of the depressed portion 10d can be, for example, 0.2 to 20 mm.

The elastic plate 20 is arranged on the upper surface 10a of the main body portion 10 so as to cover the open surface of the depressed portion 10d. The elastic plate 20 has elasticity and can be easily deformed. As the elastic plate 20, a rubber plate is preferable. Examples of the rubber include natural rubbers and synthetic rubbers, such as styrene butadiene rubbers, butadiene rubbers, butyl rubbers, ethylene propylene rubbers, nitrile rubbers, chloroprene rubbers, fluororubbers, silicone rubbers, and urethane rubbers. The thickness of the elastic plate 20 is not particularly limited, and can be, for example, 0.3 to 3.0 mm.

The elastic plate 20 is fixed to the main body portion 10 by a ring member 25 and bolts 31. The ring member 25 has an opening 25a at a position corresponding to the depressed portion 10d of the main body portion 10 and thus forms a ring shape. The ring member 25 is arranged on the elastic plate 20 so that a central portion (a portion opposed to the depressed portion 10d) in the elastic plate 20 is exposed. Thus, the peripheral portion of the elastic plate 20 is sandwiched between the main body portion 10 and the ring member 25. Through holes h are formed both in the ring member 25 and the elastic plate 20, and threaded holes j corresponding to these through holes h are formed in the main body portion 10, and by the bolts 31 being arranged through these through holes h, screwed into the threaded holes j, and fixed, the peripheral portion of the elastic plate 20 is closely fixed to a portion around the depressed portion 10d, in the upper surface 10a of the main body portion 10.

It is preferable that the inner diameter of the opening 25a of the ring member 25 is made larger than the inner diameter of the depressed portion 10d of the main body portion 10, as shown in FIG. 1 and FIG. 2.

The main body portion 10 further has a communication path 10e that opens into the bottom surface 10c of the depressed portion 10d. In this embodiment, the communication path 10e opens into the bottom surface 10c of the depressed portion 10d, but the communication path 10e need only open into the inner surface of the depressed portion 10d, and may open, for example, into the side surface 10b of the depressed portion 10d. In addition, the shape and number of the opening of the communication path 10e are also not particularly limited.

The pump 50 is connected to the communication path 10e via a connection pipe 14.

The pump 50 includes a cylinder 51, a piston 53 arranged in the cylinder 51, and a piston rod 54 connected to the piston 53. A motor 55 that axially reciprocates the piston rod 54 is connected to the piston rod 54. The piston rod 54 may be manually moved.

In this embodiment, a closed space V formed by the main body portion 10, the connection pipe 14, and the cylinder 51 is formed between the elastic plate 20 and the piston 53, and a fluid FL is filled in the closed space V. The fluid FL is not particularly limited, but liquids are preferable, and particularly, spindle oil and the like are preferable. By moving the piston 53, the fluid FL can be discharged from the depressed portion 10d of the main body portion 10, and the fluid FL can be supplied into the depressed portion 10d. In addition, it is also preferable that the fluid FL is gas, such as air.

The holding portion 80 is provided on the main body portion 10. The holding portion 80 has a holder 81 that holds a honeycomb-structured object 70, and a pneumatic cylinder 82 to which the holder 81 is connected.

The holder 81 holds the honeycomb-structured object 70 so that one side open surfaces of through holes 70a are opposed to the elastic plate 20 and the depressed portion 10d, as shown in FIG. 1.

The pneumatic cylinder 82 has a cylinder 82a extending in a vertical direction, and a piston 82b provided in the cylinder 82a, and by adjusting externally supplied pressure, pressure on both upper and lower sides of the piston 82b can be adjusted. Thus, the pneumatic cylinder 82 can move the holder 81 in a direction in which the honeycomb-structured object 70 and the elastic plate 20 approach each other and in a direction in which these go away from each other. In addition, by pressing the holder 81 downward by a predetermined force according to the supply pressure of gas in front of and behind the piston 82b, the pneumatic cylinder 82 can bring the honeycomb-structured object 70 into close contact with a mask 170 described later. Further, by releasing pressure in front of and behind the piston 82b, the pneumatic cylinder 82 can also allow the holder 81 to move freely in the vertical direction. In other words, the holding portion 80 can switch between a state in which the honeycomb-structured object 70 that the holder 81 holds can be freely moved in an upper direction and a state in which the honeycomb-structured object 70 is fixed to the main body portion 10.

Figure 3:
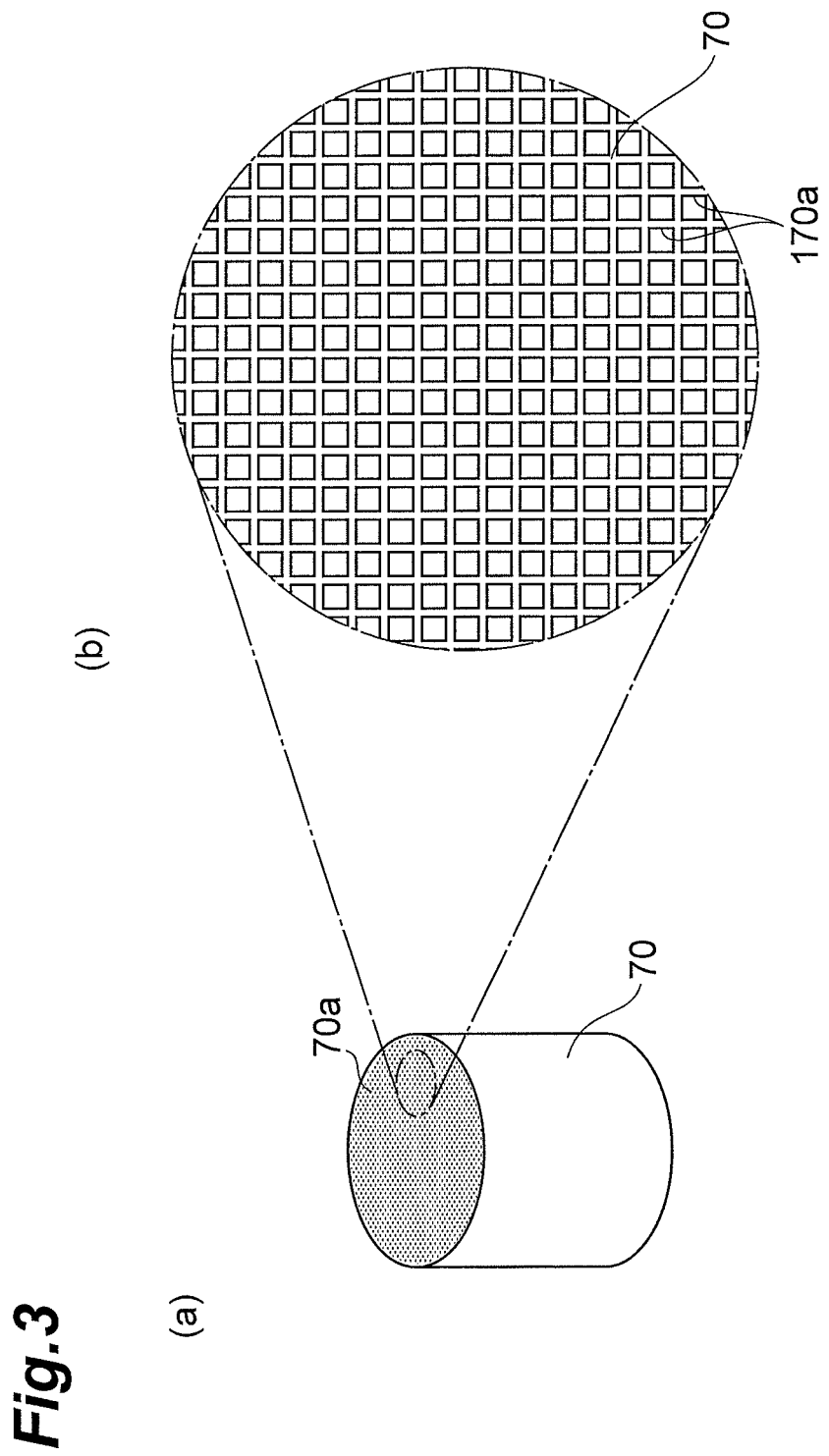
FIG. 3(a) is a perspective view of a honeycomb-structured object used in the plugging device in FIG. 1.
FIG. 3(b) is partially enlarged view of FIG. 3(a).

One example of the honeycomb-structured object 70 used in this embodiment is a cylinder in which a large number of through holes 70a are arranged generally parallel, as shown in FIG. 3(a). The cross-sectional shape of the through hole 70a is a square as shown in FIG. 3(b). These plurality of through holes 70a are arranged in squares in the honeycomb-structured object 70 as seen from an end surface, that is, they are arranged so that the central axes of the through holes 70a are positioned at the vertexes of squares, respectively. The size of the square of the cross section of the through hole 70a can be, for example, one side of 0.8 to 2.5 mm.

In addition, the length of the honeycomb-structured object 70 in a direction in which the through holes 70a extend is not particularly limited, and can be, for example, 40 to 350 mm. In addition, the outer diameter of the honeycomb-structured object 70 is also not particularly limited, and can be, for example, 10 to 320 mm.

The material of the honeycomb-structured object 70 is not particularly limited, and ceramic materials are preferable in terms of high temperature resistance. Examples of the material include oxides, such as alumina, silica, mullite, cordierite, glass, and aluminum titanate, silicon carbide, silicon nitride, and metals. Aluminum titanate can further contain magnesium and/or silicon. Such a honeycomb-structured object 70 is usually porous.

In addition, the honeycomb-structured object 70 may be a green molded body (unfired molded body) that becomes the ceramic material as described above by subsequently firing it. The green molded body contains an inorganic compound source powder that is a ceramic raw material, and an organic binder, such as methyl cellulose, and additives added as required.

For example, in the case of a green molded body of aluminum titanate, the inorganic compound source powder can contain an aluminum source powder, such as an α-alumina powder, and a titanium source powder, such as an anatase type or rutile type titania powder, and can further contain a magnesium source powder, such as a magnesia powder or a magnesia spinel powder, and/or a silicon source powder, such as a silicon oxide powder or a glass frit, as required.

Examples of the organic binder include celluloses, such as methyl cellulose, carboxylmethyl cellulose, hydroxyalkylmethyl cellulose, and sodium carboxylmethyl cellulose; alcohols, such as polyvinyl alcohol; and lignin sulfonate.

Examples of the additives include a pore-forming agent, a lubricant and a plasticizer, a dispersing agent, and a solvent.

Examples of the pore-forming agent include carbon materials, such as graphite; resins, such as polyethylene, polypropylene, and polymethyl methacrylate; plant materials, such as starch, nutshells, walnut shells, and corn; ice; and dry ice.

Examples of the lubricant and the plasticizer include alcohols, such as glycerin; higher fatty acids, such as caprylic acid, lauric acid, palmitic acid, arachidic acid, oleic acid, and stearic acid; metal stearates, such as aluminum stearate; and polyoxyalkylene alkyl ether.

Examples of the dispersing agent include inorganic acids, such as nitric acid, hydrochloric acid, and sulfuric acid; organic acids, such as oxalic acid, citric acid, acetic acid, malic acid, and lactic acid; alcohols, such as methanol, ethanol, and propanol; and surfactants, such as ammonium polycarboxylate.

As the solvent, for example, monohydric alcohols, such as methanol, ethanol, butanol, and propanol; glycols, such as propylene glycol, polypropylene glycol, and ethylene glycol; and water can be used.

The mask 170 is arranged in the opening 25a of the ring member 25 on the elastic plate 20. The material of the mask 170 is not particularly limited, and examples of the material include metals and resins.

Figure 4:
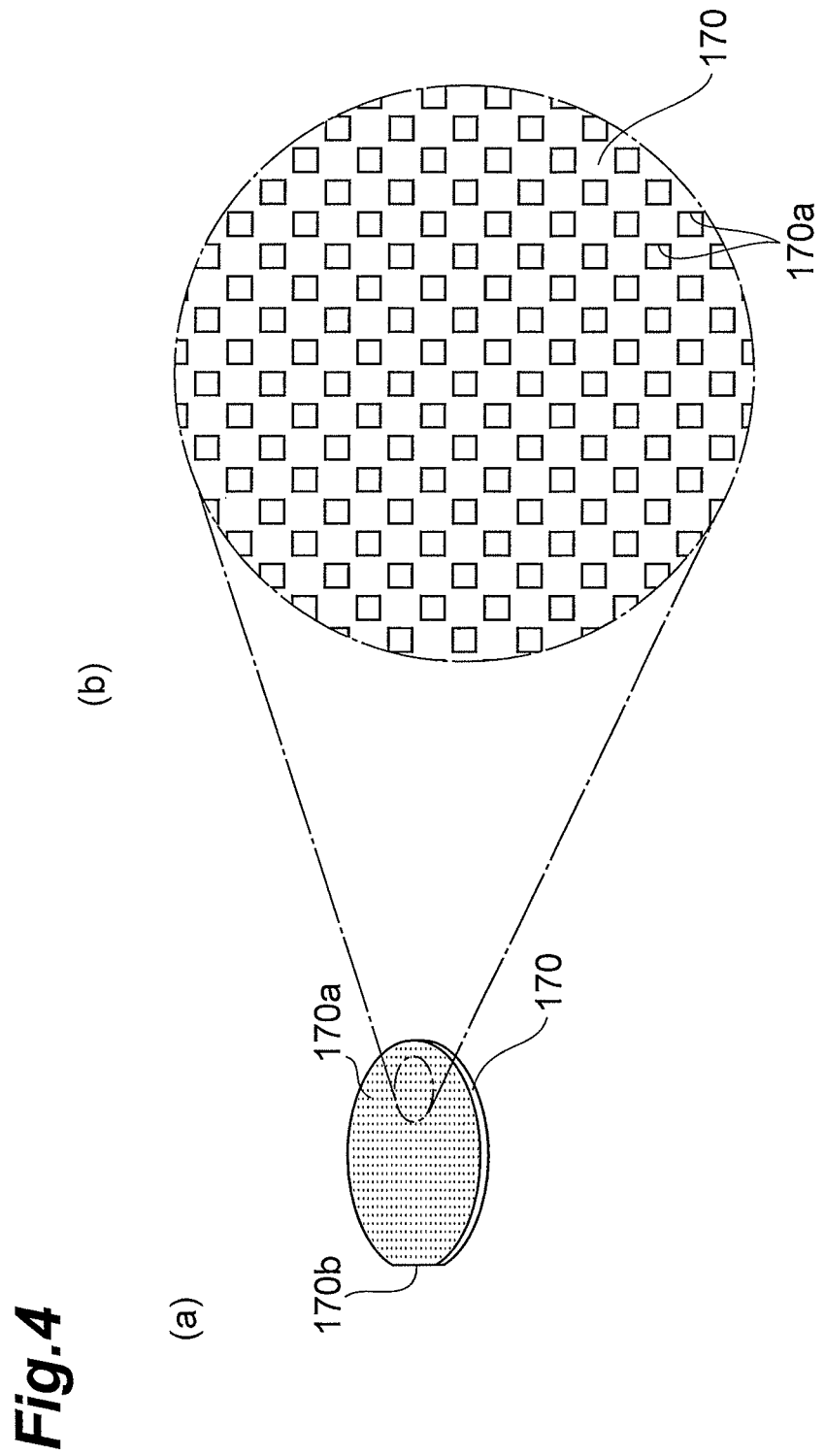
FIG. 4(a) is a perspective view of a mask in FIG. 1.
FIG. 4(b) is partially enlarged view of FIG. 4(a).

One example of the mask 170 used in this embodiment is shown in FIG. 4(a). The mask 170 is a circular, plate-like member and has a large number of through holes 170a extending in a thickness direction. The cross-sectional shape of the through hole 170a is a square corresponding to the through hole 70a of the honeycomb-structured object 70 (see FIG. 3(b)), as shown in FIG. 4(b). These plurality of through holes 170a are arranged staggered, as shown in FIG. 4(b), and the through holes 170a are arranged opposed to only a plurality of through holes in the relationship of not being adjacent to each other at the top, bottom, left, and right, among the plurality of through holes 70a arranged in squares in FIG. 3(b). In order to make the positioning of the through holes 170a of the mask 170 easy, an orientation flat 170b is formed on the mask 170, and a protrusion 25b corresponding to the orientation flat may also be provided on the ring member 25 correspondingly. It is preferable that the outer diameter of the mask 170 is made larger than the inner diameter of the depressed portion 10d of the main body portion 10, as shown in FIG. 1.

It is preferable that a vibrator 140, such as an ultrasonic vibrator, is provided on the main body portion 10.

(Manufacturing Method)

Next, a method for manufacturing a honeycomb-structured object, using the above-described plugging device 100, will be described. First, from a state in FIG. 1, the pneumatic cylinder 82 is previously driven to pull up upward the holder 81 that holds the honeycomb-structured object 70, and remove the mask 170 from the elastic plate 20. Next, by pulling the piston 53 of the pump 50 downward, the fluid FL is discharged downward from the depressed portion 10d of the main body portion 10. Thus, the elastic plate 20 deforms and comes into close contact with the side surface 10b and the bottom surface 10c of the depressed portion 10d, as shown in FIG. 5(a), and thus, the depressed portion 20d of the elastic plate 20 is formed.

Next, a plugging material 130 is supplied into the depressed portion 20d of the elastic plate 20, as shown in FIG. 5(b). The flattening of the surface of and defoaming of the plugging material 130 is promoted by driving the vibrator 140, as required.

(Plugging Material)

The plugging material 130 is not particularly limited as long as it can close ends of the through holes 70a of the honeycomb-structured object 70, but it is preferable that the plugging material 130 is liquid. Examples of the plugging material include a slurry containing a ceramic material or a ceramic raw material, a binder, and a solvent.

Examples of the ceramic material include the constituent materials for the honeycomb-structured object described above and their raw materials.

Examples of the binder include organic binders, such as celluloses, such as methyl cellulose, carboxylmethyl cellulose, hydroxyalkylmethyl cellulose, and sodium carboxylmethyl cellulose; alcohols, such as polyvinyl alcohol; and lignin sulfonate.

The use amount of the binder can be, for example, 3 to 5000 mL.

As the solvent, for example, monohydric alcohols, such as methanol, ethanol, butanol, and propanol; glycols, such as propylene glycol, polypropylene glycol, and ethylene glycol; and water can be used. Among them, water is preferable, and ion-exchange water is more preferably used in that the amount of impurities is small.

The use amount of the solvent can be 15 to 40% by weight.

Next, as shown in FIG. 6(a), the mask 170 is set on the elastic plate 20 so as to cover the depressed portion 10d of the main body portion 10, and then, by moving the holder 81 downward by the pneumatic cylinder 82 to bring the honeycomb-structured object 70 into contact with the mask 170, a part of the through holes 70a of the honeycomb-structured object 70, and the through holes 170a of the mask 170 are allowed to communicate with each other, and further, the holder 81 is pressed downward by the pneumatic cylinder 82 to fix the honeycomb-structured object 70 to the mask 170 and the main body portion 10 so that the lower end surface (one end surface) of the honeycomb-structured object 70 is opposed to the depressed portion 20d of the elastic plate 20 via the mask 170.

Then, by moving the piston of the pump 50 upward, the fluid FL is supplied into the depressed portion 10d, and thus, the elastic plate 20 moves toward the mask 170, and the elastic plate 20 presses the plugging material against the one end surface of the honeycomb-structured object 70, as shown in FIG. 6(b). This step is performed until the elastic plate 20 comes into contact with the mask 170, and the deformation of the elastic plate 20 is eliminated, that is, the depressed portion 20d of the elastic plate 20 is eliminated, as shown in FIG. 7(a).

Thus, the plugging material 130 is supplied into the part of the through holes 70a of the honeycomb-structured object 70 via the through holes 170a of the mask 170, and plugging portions 70p are formed.

Next, the pressing of the honeycomb-structured object 70 in a lower direction by the pneumatic cylinder 82 is stopped so that the honeycomb-structured object 70 can move freely upward, and then, the piston 53 is further raised to further supply the fluid FL between the elastic plate 20 and the main body portion 10. Thus, as shown in FIG. 7(b), a portion in the elastic plate 20 opposed to the one end surface of the honeycomb-structured object deforms in the form of a raised portion in an upper direction, and thus, a load is applied to the central portion of the mask 170, and the mask 170 and the honeycomb-structured object 70 move upward. At this time, the mask 170 goes away from the peripheral portion (the other part) of the elastic plate 20 deforming in the form of a raised portion, and thus, the mask 170 and the honeycomb-structured object 70 can be easily pulled away from the main body portion 10.

Next, after the honeycomb-structured object 70 is removed from the holder 81, the honeycomb-structured object 70 is turned upside down, and then, the honeycomb-structured object 70 is held by the holder 81 again. Then, using a mask 170' with staggered arrangement in which the arrangement of the through holes 170a is diametrically opposite to that of the mask 170, similar operations are performed on the other end surface of the honeycomb-structured object. Thus, the other end side of the remaining through holes 70a is plugged with the plugging material, and plugging portions 70p are formed, as shown in FIG. 8(a). Next, by deforming a portion in the elastic plate 20 opposed to the other end surface of the honeycomb-structured object in the form of a raised portion upward as in the above, the mask 170' and the honeycomb-structured object 70 can be easily pulled away from the main body portion 10 and the elastic plate 20.

Then, by drying and firing the honeycomb-structured object 70 in which both ends of the through holes 70a are plugged in this manner, and so on, a honeycomb filter-structured object can be manufactured.

According to the present invention, by deforming, in the form of a raised portion, a portion in the elastic plate 200 opposed to the one end surface of the honeycomb-structured object, the central portion that is a part of the elastic plate (plate) protrudes toward the one end surface of the honeycomb-structured object 70, and thus, the mask 170 in contact with the honeycomb-structured object 70 after the plugging material 130 is supplied can be easily pulled away from the main body portion 10 and the elastic plate 20. Therefore, production efficiency can be increased, and a plugged honeycomb-structured object can be manufactured at reduced cost.

In addition, by using the elastic plate 20, there is a tendency that during plugging, pressure is easily equally applied to the plugging material, and the plugging material tends to be easily equally supplied to the plurality of through holes.

Second Embodiment

Next, the second embodiment of the present invention will be described with reference to FIG. 9. Here, only differences from the first embodiment will be described, and redundant description will be omitted.

A plugging device 200 in this embodiment mainly includes a cylinder 202 that houses a honeycomb-structured object 70, a closing plate 204 that closes one end of the cylinder 202, and a primary piston 214 and a secondary piston 218 to be inserted into the cylinder 202. The honeycomb-structured object 70 is housed in the cylinder 202 so that the axial direction of its through holes 70a is parallel to the axial direction of the cylinder 202, and the honeycomb-structured object 70 is in contact with the closing plate 204.

The primary piston 214 includes a primary piston plate 212 and a primary piston rod 213. In addition, the secondary piston 218 includes a secondary piston plate 216 and a secondary piston rod 217.

The primary piston plate 212 is a disk with an outer diameter corresponding to the inner diameter of the cylinder 202. The secondary piston plate 216 is a disk with an outer shape smaller than the inner diameter of the cylinder 202. A depressed portion 212a that can house the secondary piston plate 216 is formed in the central portion of the primary piston plate 212, and in a housed state, the surface of the primary piston plate 212 and the surface of the secondary piston plate 216 are positioned on the same plane.

In addition, the primary piston plate 212 and the primary piston rod 213 have a through hole 213a through which the secondary piston rod 217 is allowed to pass axially. As shown in FIG. 9(a), the secondary piston rod 217 is housed in the through hole 213a of the primary piston rod 213.

In manufacturing, first, a mask 170 is arranged on one end of the honeycomb-structured object in the cylinder 202, and next, a plugging material 130 is supplied onto the mask 170, and then, the primary piston 214 and the secondary piston 218 are inserted into the cylinder. Next, by pressing the primary piston 214 against the honeycomb-structured object 70, the plugging material 130 is supplied into the through holes 170a via the through holes 170a of the mask 170 by the primary piston plate 212 and the secondary piston plate 216, as shown in FIG. 9(b), and thus, plugging portions 70p are formed.

Next, the fixing of the closing plate 204 and the cylinder 204 (screws, clamps, or the like: not shown) is released, and then, the primary piston 214 is pressed until the primary piston plate 212 reaches the end of the cylinder 202, to expose the honeycomb-structured object 70 outside, as shown in FIG. 9 (c). Then, with respect to the primary piston 214, the secondary piston rod 217 of the secondary piston 218 is pressed in the direction of the honeycomb-structured object 70. Thus, the secondary piston plate 216 that is a part of an entire piston plate (plate) 219 formed by the primary piston plate 212 and the secondary piston plate 216 protrudes toward the mask 170, and therefore, the mask 170 and the honeycomb-structured object 70 can be easily pulled away from the primary piston plate 212. Then, the closing plate 204 and the mask 170 are removed from the honeycomb-structured object 70.

The present invention is not limited to the above embodiments, and various modifications can be made.

For example, in the first embodiment, the elastic plate 20 is fixed to the main body portion 10 by the ring member 25 and the bolts 31, but a fixing method is not particularly limited. For example, the elastic plate 20 may be fixed to the upper surface 10a of the main body portion 10 by an adhesive.

In addition, in the first embodiment, the communication path 10e is formed by the main body portion 10 and the connection pipe 14, but the pump 50 may be directly connected to the main body portion 10 without the connection pipe 14.

In addition, in the first embodiment, a piston pump including the cylinder 51, the piston 53, and the piston rod 54 is used as the pump 50, but the pump 50 is not particularly limited as long as it can supply and discharge a fluid.

In addition, in the first embodiment, the shape of the depressed portion 10d is not particularly limited and can be appropriately set according to the honeycomb-structured object 70 to be plugged.

For example, the planar shape of the depressed portion 10d as seen from above can also be an ellipse, a rectangle, a square, or the like other than a circle. In this case, a size in the case of a rectangle or a square can be, for example, one side of 50 to 300 mm. In addition, the side surface 10b and the bottom surface 10c need not be perpendicular and parallel to the upper surface 10a of the main body portion 10, respectively, and may each be, for example, an inclined surface or a curved surface.

In addition, in the first embodiment, the holding portion 80 includes the pneumatic cylinder 82, but this is not limiting, and the pneumatic cylinder 82 can be replaced by various mechanisms, for example, gear mechanisms.

In addition, in the first embodiment, the holding portion 80 is not necessarily essential. For example, it is possible to fix the honeycomb-structured object to the main body portion 10 by placing a weight on the honeycomb-structured object 70, when supplying the plugging material, and remove the weight to make the honeycomb-structured object movable, when moving the honeycomb-structured object 70 away from the main body portion. In addition, when the honeycomb-structured object has some weight, a mode without special fixing means is also possible because the honeycomb-structured object is fixed by self-weight.

In addition, the shape of a surface in contact with the mask 170, in the secondary piston plate 216 used in the second embodiment, is not particularly limited and can be appropriately determined according to the shape of the target honeycomb-structured object 70. For example, when the honeycomb-structured object 70 is a cylindrical shape, the diameter of the secondary piston plate 216 can be made ⅕ to ½ of the outer diameter of the honeycomb-structured object 70.

In addition, in the first embodiment and the second embodiment, the shape and structure of the honeycomb-structured object 70 are also not limited to the above. For example, the outer shape of the honeycomb-structured object 70 may not be a cylinder and may be, for example, a prism, such as a quadrangular prism. In addition, the cross-sectional shape of the through hole 70a of the honeycomb-structured object 70 may not be a square and may be, for example, a rectangle, a triangle, a polygon, or a circle. Further, the arrangement of the through holes 70a may not be square arrangement and may be, for example, triangular arrangement, or staggered arrangement. In addition, in this case, the shape and arrangement of the through holes of the mask can also be appropriately changed according to the shape and arrangement of the through holes 70a of the honeycomb-structured object 70.

In addition, in the above two embodiments, the plate-like mask 170 having a large number of through holes is used, and a place shielded by the mask is also arbitrary. Further, it is possible to carry out even without using such a mask 170. For example, a material that decomposes on heating is plugged into a part of the through holes 70a of the honeycomb-structured object 70 before plugging treatment, and the plugs need only be pyrolyzed or the like after plugging. In the present invention, there is an effect that even when no mask is used, the honeycomb-structured object 70 can be easily pulled away from the elastic plate 20 on the main body portion 10 or the entire piston plate 219 by protruding a part of the elastic plate 20 or the entire piston plate 219 after plugging treatment.

Further, in the above embodiments, the central portion of the portion in the elastic plate 20 or the entire piston plate 219 opposed to the one end surface of the honeycomb-structured object is protruded, but a part of the entire portion opposed to the one end surface need only be protruded, and a plurality of places may be partially protruded. Further, the method of protruding a part of the plate pressing the plugging material, toward the honeycomb-structured object, is also not limited to the above.

REFERENCE SIGNS LIST

10 . . . main body portion, 10e . . . communicate portion, 20 . . . elastic plate (plate), 30 . . . depressed portion, 50 . . . pump, 70 . . . honeycomb-structured object, 70a through hole, 80 . . . holding portion, 100, 200 . . . plugging device, 170 . . . mask, 219 . . . entire piston plate (plate).

The invention claimed is:

1. A method for manufacturing a honeycomb-structured object, the honeycomb-structured object having a plurality of through holes, the plurality of through holes having plugged ends, comprising:
   pressing a plugging material against one end surface of the honeycomb-structured object using a plate;
   wherein the pressing of the plate against the one end surface of the honeycomb-structured object fills ends of the through holes with the plugging material; and
   after the through holes have been filled with the plugging material, protruding a portion of the plate toward the one end surface of the honeycomb-structured object;
   wherein the protruding of the portion of the plate separates a portion of the plate from the one end surface of the honeycomb-structured object.

2. The method according to claim 1, wherein the portion of the plate that is protruding is a central portion of the plate.

3. The method according to claim 1, wherein a mask is interposed between the one end surface of the honeycomb-structured object and the plate; and
   wherein the mask includes through holes that communicate with at least one of the plurality of through holes of the honeycomb-structured object.

4. The method according to claim 1, wherein the plate is an elastic plate; and
   wherein the protruding is performed by deforming the portion of the plate in the form of a raised portion.

5. The method according to claim 1, further comprising:
   pressing a plugging material against a second end surface of the honeycomb-structured object using the plate;
   wherein the pressing of the plate against the second end surface of the honeycomb-structured object fills other ends of the through holes with the plugging material;
   after the second end of the through holes have been filled with the plugging material, protruding a portion of the plate toward the second end surface of the honeycomb-structured object; and
   wherein the protruding of the portion of the plate separates a portion of the plate from the second end surface of the honeycomb-structured object.

6. The method according to claim 1 further comprising:
   preparing a main body having a depressed portion and a communication path opening into an inner surface of the depressed portion,
   wherein the plate is arranged so as to cover the depressed portion,
   wherein the plate is an elastic plate;
   removing a fluid that is located within the depressed portion via the communication path in order to deform the elastic plate;
   wherein the deformation of the elastic plate forms a depressed portion in the elastic plate that conforms in shape to the depressed portion of the main body;
   supplying the plugging material into the depressed portion of the elastic plate,
   arranging the one end surface of a honeycomb-structured object having the plurality of through holes at a position opposed to the depressed portion of the elastic plate, and
   supplying the fluid between the main body portion and the elastic plate via the communication path to eliminate the depressed portion of the elastic plate, and
   supplying the fluid between the main body portion and the elastic plate via the communication path to deform a portion of the elastic plate in order to form the protruding of the portion of the elastic plate.

7. A method for manufacturing a honeycomb-structured object, the honeycomb-structured object having a plurality of through holes, the plurality of through holes having plugged ends, comprising:
   pressing a plugging material against one end surface of the honeycomb-structured object using an elastic plate;
   wherein the pressing of the plate against the one end surface of the honey-comb structured object fills ends of the through holes with the plugging material; and
   after the through holes have been filled with the plugging material, deforming a portion of the elastic plate in the shape of a raised portion that is deformed toward the one end surface of the honeycomb-structured object;
   wherein the deforming of the portion of the elastic plate pulls a peripheral portion of the elastic plate and a peripheral portion of the one end surface of the honeycomb structured object away from each other.

8. A method for manufacturing a honeycomb-structured object, the honeycomb-structured object having a plurality of through holes, the plurality of through holes having plugged ends, comprising:
   providing a main body portion having a depressed portion and a communication path opening into an inner surface of the depressed portion, and
   an elastic plate arranged so as to cover the depressed portion;
   removing a fluid that is located within the depressed portion via the communication path in order to deform the elastic plate;
   wherein the deformation of the elastic plate forms a depressed portion in the elastic plate that conforms to the shape of the depressed portion of the main body;

supplying a plugging material into the depressed portion of the elastic plate;

arranging one end surface of a honeycomb-structured object at a position opposed to the depressed portion of the elastic plate; and supplying the fluid between the main body portion and the elastic plate via the communication path to eliminate the depressed portion of the elastic plate and to deform a portion in the elastic plate forming a protruding portion in the elastic plate;

wherein the protruding portion of the elastic plate separates a portion of the plate from the one end surface of the honeycomb-structured object.

\* \* \* \* \*